(12) United States Patent
Chen

(10) Patent No.: US 11,372,279 B2
(45) Date of Patent: Jun. 28, 2022

(54) DISPLAY AND METHOD OF MANUFACTURING SAME

(71) Applicant: TCL China Star Optoelectronics Technology Co., Ltd., Shenzhen (CN)

(72) Inventor: Xingwu Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/620,490

(22) PCT Filed: Oct. 25, 2019

(86) PCT No.: PCT/CN2019/113444
§ 371 (c)(1),
(2) Date: Dec. 7, 2019

(87) PCT Pub. No.: WO2020/228248
PCT Pub. Date: Nov. 19, 2020

(65) Prior Publication Data
US 2022/0066257 A1    Mar. 3, 2022

(30) Foreign Application Priority Data

May 13, 2019  (CN) .......................... 201910392443.2

(51) Int. Cl.
| | | |
|---|---|---|
| *G02F 1/1339* | (2006.01) | |
| *G02F 1/1335* | (2006.01) | |
| *G02F 1/1333* | (2006.01) | |
| *G02F 1/1341* | (2006.01) | |
| *G02F 1/1368* | (2006.01) | |

(52) U.S. Cl.
CPC ...... *G02F 1/133377* (2013.01); *G02F 1/1341* (2013.01); *G02F 1/1368* (2013.01); *G02F 1/13394* (2013.01); *G02F 1/133514* (2013.01); *G02F 1/13398* (2021.01)

(58) Field of Classification Search
CPC ......... G02F 1/133377; G02F 1/133514; G02F 1/13394; G02F 1/1341; G02F 1/1368; G02F 1/13398
See application file for complete search history.

(56) References Cited

U.S. PATENT DOCUMENTS

| | | | |
|---|---|---|---|
| 5,771,084 A | 6/1998 | Fujimori et al. | |
| 6,661,484 B1 | 12/2003 | Iwai et al. | |
| 2006/0103785 A1 | 5/2006 | Yamada et al. | |

(Continued)

FOREIGN PATENT DOCUMENTS

| | | |
|---|---|---|
| CN | 1270326 A | 10/2000 |
| CN | 1755455 A | 4/2006 |

(Continued)

*Primary Examiner* — Thoi V Duong
(74) *Attorney, Agent, or Firm* — Nathan & Associates; Menachem Nathan

(57) ABSTRACT

The present invention provides a display and a method of manufacturing the same. The display includes a transistor substrate, a color filter substrate, and a liquid crystal cell. The liquid crystal cell includes a plurality of protrusion structures dividing the liquid crystal cell into a first liquid crystal region and a second liquid crystal region, and the first liquid crystal region and the second liquid crystal region respectively include a first liquid crystal and a second liquid crystal, wherein a product of an average refractive index and a thickness of the first liquid crystal is different from that of the second liquid crystal.

10 Claims, 3 Drawing Sheets

(56) References Cited

U.S. PATENT DOCUMENTS

2008/0278670 A1    11/2008   Abe et al.
2015/0077687 A1    3/2015   Chiang et al.

FOREIGN PATENT DOCUMENTS

| | | |
|---|---|---|
| CN | 101303466 A | 11/2008 |
| CN | 103135273 A | 6/2013 |
| CN | 104460073 A | 3/2015 |
| CN | 109143690 A | 1/2019 |
| JP | H09244004 A | 9/1997 |

DISPLAY AND METHOD OF MANUFACTURING SAME

BACKGROUND OF INVENTION

Field of Invention

The present invention relates to a field of displays, and more particularly to a liquid crystal display screen of a low reflection and a method of manufacturing the same.

Description of Prior Art

Currently used liquid crystal displays are divided into a twist nematic (TN) mode, a vertical alignment (VA) mode, an in-plane switching (IPS) mode, and a fringe field switching (FFS) mode, etc. The most commonly used VA display mode is polymer stabilized vertical alignment (PSVA) because of its high contrast and fast response time. With the rapid development of display technology, PSVA liquid crystal display has become the most extensive display technology at present. However, users have higher and higher requirements for display technology. Wide viewing angles and high transmittance have always been important directions for future development. Relationship between a transmittance (Tr) of PSVA and an average refractive index (Δn) of the liquid crystal is as shown in the following formula 1. As a wavelength (λ) increases, the average refractive index (Δn) gradually decreases, easily resulting in a reversal of the transmittance (Tr) of a short-wavelength region, that is, when the voltage increases, the transmittance (Tr) of a long-wavelength region increases, while the transmittance (Tr) of the short-wavelength region decreases, resulting in a yellowish color (brightness of blue light is low, brightness of red and green light is high, and the color point is yellowish) as shown in FIGS. 1 and 2. FIG. 1 is a plot showing an average refractive index (Δn) of a liquid crystal as a function of wavelength; and FIG. 2 is a plot showing a transmittance (Tr) of a different wavelength region as a function of voltage.

$$Tr \propto \frac{1}{2}\sin^2\frac{\pi\Delta nd}{\lambda} \quad (1)$$

One of the most effective ways to increase the transmittance of the display device is to increase the product of cell thickness and average refractive index (Δnd). However, increasing the cell thickness will increase the amount of the liquid crystal, and thus increase the cost. The common way is to maintain the cell thickness (d) unchanged and increase the average refractive index (Δn) of the liquid crystal. However, increasing the average refractive index (Δn) easily causes a reversal of the transmittance (Tr) of the short-wavelength region, thus resulting a yellowish color problem. In addition, the yellower the color point, the worse the viewing angles.

In order to solve the problem of color shift of the display affecting the user's experience, there is an urgent need for a liquid crystal display that can improve the color shift problem and achieve high transmittance.

SUMMARY OF INVENTION

In view of this, the present invention provides a novel display which increases the transmittance of the display device by increasing the average refractive index (Δn) of the liquid crystal. Further, a chiral agent is introduced into the liquid crystal in the blue region, thereby increasing the average refractive index (Δn), preventing a reversal from occurring while maintaining a brightness of the blue light, thereby solving the problem of yellowing or greening of the color point, thereby realizing a high-visibility large-angle display. Meanwhile, a plurality of protruding structures are formed inside a liquid crystal cell to seal the liquid crystal, restricting the flow of the liquid crystal, such that the display can also be used as a flexible display device.

According to an embodiment of the invention, the present invention provides a display including: a transistor substrate; a color filter substrate disposed on the transistor substrate; a liquid crystal cell disposed between the transistor substrate and the color filter substrate, the liquid crystal cell including a plurality of protrusion structures dividing the liquid crystal cell into a first liquid crystal region and a second liquid crystal region, wherein the first liquid crystal region corresponds to a blue pixel, the second liquid crystal region corresponds to a red pixel and/or a green pixel, and the first liquid crystal region and the second liquid crystal region respectively include a first liquid crystal and a second liquid crystal, and wherein a product of an average refractive index and a thickness of the first liquid crystal is different from that of the second liquid crystal.

According to another embodiment of the present invention, the present invention also provides a method of manufacturing a display, including: S10, providing a transistor substrate; S20, providing a color filter substrate; S30, forming a plurality of protrusion structures on the transistor substrate or the color filter substrate to define a first liquid crystal region and a second liquid crystal region, wherein the first liquid crystal region corresponds to a blue pixel, and the second liquid crystal region corresponds to a red pixel and/or a green pixel; S40, injecting a first liquid crystal and a second liquid crystal respectively into the first liquid crystal region and the second liquid crystal region, wherein a product of an average refractive index and a thickness of the first liquid crystal is different from that of the second liquid crystal; S50: assembling the transistor substrate and the color filter substrate to define a liquid crystal cell between the transistor substrate and the color filter substrate to obtain the display.

According to an embodiment of the invention, the step S40 further includes: adding a chiral agent to the first liquid crystal to obtain the first liquid crystal mixed with a chiral agent.

According to an embodiment of the invention, the plurality of protrusion structures include at least one of: at least one black matrix, at least one photosensitive spacer, and a color filter layer disposed on the color filter substrate.

According to an embodiment of the invention, the product of the average refractive index and the thickness of the first liquid crystal ranges from 350 nm to 450 nm.

According to an embodiment of the invention, the product of the average refractive index and the thickness of the second liquid crystal ranges from 290 nm to 380 nm.

According to an embodiment of the invention, the pitches of the first and second liquid crystals are both 2 to 7 times the cell gap.

The present invention provides a novel display which increases the transmittance of the display device by increasing the average refractive index (Δn) of the liquid crystal. Further, a chiral agent is introduced into the liquid crystal in the blue region, thereby increasing the average refractive index (Δn), preventing a reversal from occurring while maintaining a brightness of the blue light, thereby solving the problem of yellowing or greening of the color point, thereby realizing a high-visibility large-angle display. Meanwhile, a plurality of protruding structures are formed inside a liquid crystal cell to seal the liquid crystal, restricting the flow of the liquid crystal, such that the display can also be used as a flexible display device.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

In order to make the above description of the present invention more comprehensible, the preferred embodiments are described below in detail with reference to the accompanying drawings.

The following description of the various embodiments is provided to illustrate the specific embodiments of the invention. The spatially relative directional terms mentioned in the present invention, such as "vertical", "horizontal", "upper", "lower", "before", "after", "left", "right", "inside", "outside", "side", etc. and the like, may be used herein for ease of description to describe one element or feature's relationship to another element(s) or feature(s) as illustrated in the figures which are merely references. The spatially relative terms are intended to encompass different orientations in addition to the orientation as depicted in the figures.

Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In order to solve the problems of the prior art, the present invention provides a novel display which increases the transmittance of the display device by increasing the average refractive index ($\Delta n$) of the liquid crystal. Further, a chiral agent is introduced into the liquid crystal in the blue region, thereby increasing the average refractive index ($\Delta n$), preventing a reversal from occurring while maintaining a brightness of the blue light, thereby solving the problem of yellowing or greening of the color point, thereby realizing a high-visibility large-angle display. Meanwhile, a plurality of protruding structures are formed inside a liquid crystal cell to seal the liquid crystal, restricting the flow of the liquid crystal, such that the display can also be used as a flexible display device.

Figure 1:
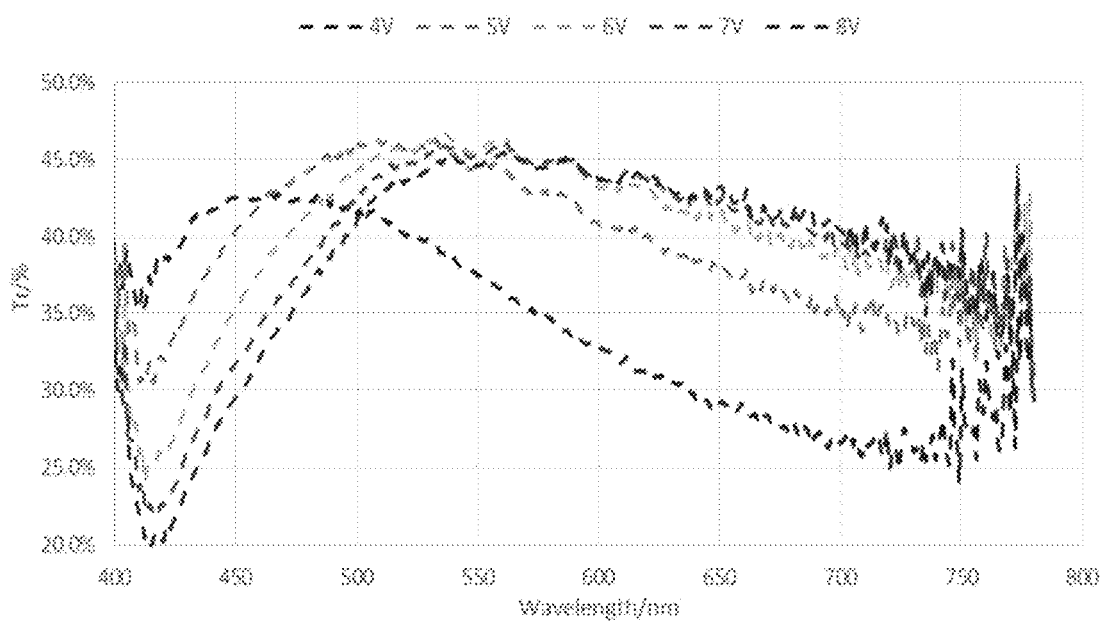
FIG. 1 is a plot showing the average refractive index ($\Delta n$) of a liquid crystal as a function of wavelength.
Figure 2:
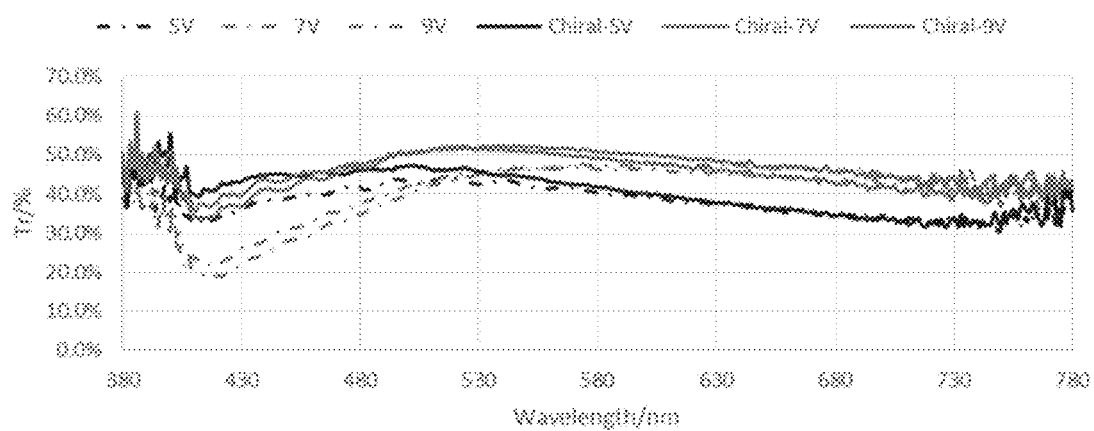
FIG. 2 is a plot of transmittance (Tr) versus voltage for different wavelength regions.
Figure 3:
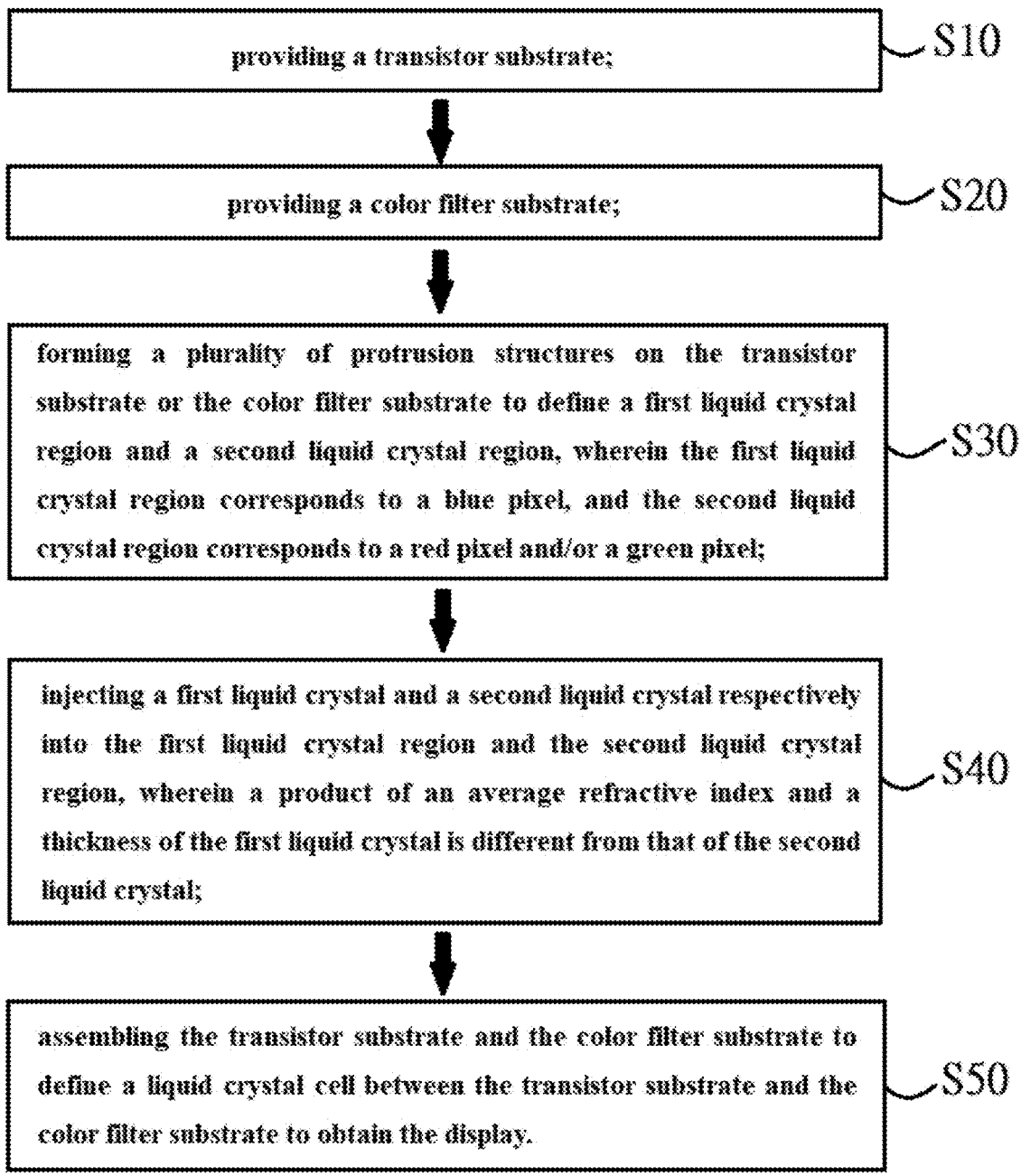
FIG. 3 is a flow chart of a method of manufacturing a display in accordance with an embodiment of the present invention.
Figure 4:
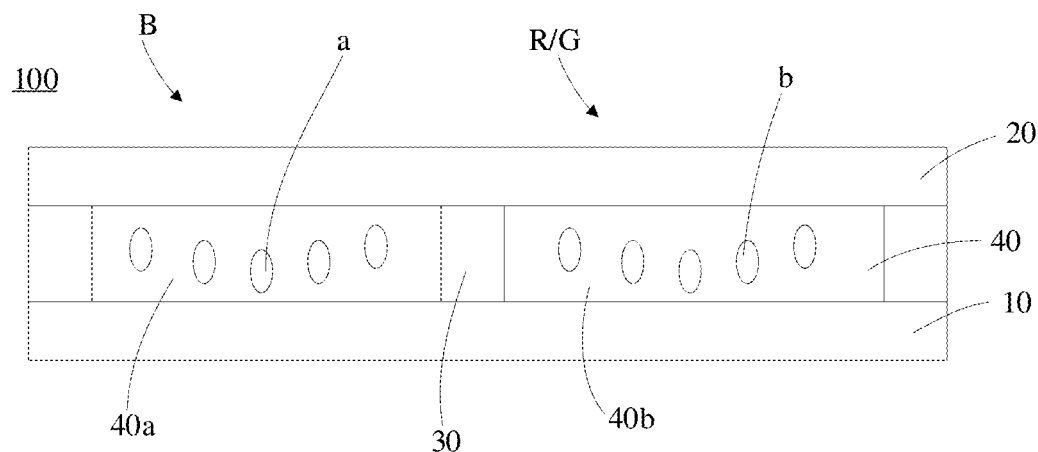
FIG. 4 is a schematic diagram of a display in accordance with an embodiment of the present invention.

FIG. 3 is a flow chart of a method of manufacturing a display in accordance with an embodiment of the present invention. FIG. 4 is a schematic diagram of a display in accordance with an embodiment of the present invention. Referring to FIG. 3 and FIG. 4, in particular, the method of manufacturing the display 100 of the present invention includes the following the steps:

S10, providing a transistor substrate 10.

S20, providing a color filter substrate 20.

In a specific embodiment, the steps S10 and S20 include: the transistor substrate 10 including a first electrode (not shown); and the color filter substrate 20 including a second electrode (not shown). Red, green, and blue color filter layers, a black matrix, and/or a photo spacer (not shown) may be introduced onto the transistor substrate 10 and/or the color filter substrate 20 to realizes color display, prevent light leakage, and contribute to cell thickness respectively, which can also form a liquid crystal retaining wall structure. The transistor substrate 10 and/or the color filter substrate 20 may be a flexible substrate or a common substrate.

S30, forming a plurality of protrusion structures 30 on the transistor substrate 10 or the color filter substrate 20 to define a first liquid crystal region 40a and a second liquid crystal region 40b, wherein the first liquid crystal region 40a corresponds to a blue pixel, and the second liquid crystal region 40b corresponds to a red pixel R and/or a green pixel G, as shown in FIG. 4.

In a specific embodiment, the step S30 includes: forming a plurality of protrusion structures 30 on the transistor substrate 10 or the color filter substrate 20. In the step 30, the plurality of protrusion structures 30 may be implemented by superposing a black matrix, a photosensitive spacer material, and/or a color filter layer, which are disposed under the color filter substrate 20, as shown in FIG. 4. In other embodiments of the present invention, the plurality of protrusion structures 30 may also be obtained by photolithography or imprinting using other materials alone. Meanwhile, an alignment layer (not shown) may be formed on the substrate before the plurality of protrusion structures 30 are formed, or after the plurality of protrusion structures 30 are formed.

In a specific embodiment, the step S30 includes separating the blue pixel B from the red pixel R and the green pixel G by the plurality of protrusion structures 30. In other embodiments of the present invention, R/G/B may also be separated according to actual needs, as shown in FIG. 4.

S40, injecting a first liquid crystal a and a second liquid crystal b respectively into the first liquid crystal region 40a and the second liquid crystal region 40b, wherein a product of an average refractive index and a thickness of the first liquid crystal 40a is different from that of the second liquid crystal 40b.

In an embodiment of the invention, the step S40 further includes: adding a chiral agent to the first liquid crystal a to obtain the first liquid crystal a mixed with a chiral agent.

In a specific embodiment, the step S40 includes: dropping the first liquid crystal a and the second liquid crystal b to a side of the substrate provided with the plurality of protrusion structures 30, respectively, and a method of injecting the liquid crystal may be ink-jet printing (IJP), or other ways. The liquid crystal is a negative liquid crystal. In an embodiment of the invention, the product of the average refractive index and the thickness of the first liquid crystal ranges from 350 nm to 450 nm, and the product of the average refractive index and thickness of the second liquid crystal ranges from 290 nm to 380 nm.

S50, assembling the transistor substrate 10 and the color filter substrate 20 to define a liquid crystal cell 40 between the transistor substrate 10 and the color filter substrate 20 to obtain the display, as shown in FIG. 4.

In a specific embodiment, the step S50 includes: forming liquid crystal cells by lamination, performing a polymer stabilized vertical alignment (PSVA) process on the liquid crystal, that is, performing ultraviolet (UV) irradiation on the liquid crystals, resulting in a pretilt angle of the liquid crystals, to form the liquid crystal display device as shown in FIG. 4.

Figure 5:
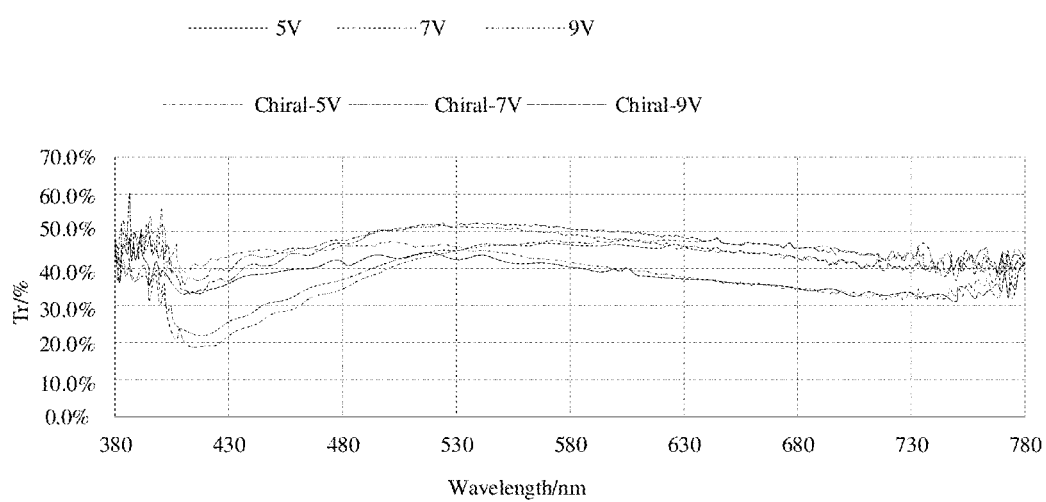
FIG. 5 is a wavelength versus transmittance spectra of different liquid crystals of a display according to an embodiment of the invention.

In the above specific embodiment, a wavelength versus transmittance spectra of different liquid crystals of a display is shown in FIG. 5, wherein 5V/7V/9V curves correspond to general liquid crystals without the chiral agent, and the chiral-5V/7V/9V curves correspond to the liquid crystals with an addition of the chiral agent. It can be seen that increasing the chiral agent under different voltage conditions can effectively increase the short wavelength region, that is, increase the transmittance of the wavelength region below 500 nm, thereby increasing the brightness of the blue light, and solving the problem of yellowing or greening of the color point.

Accordingly, as shown in FIG. 4, the display 100 obtained by the method of manufacturing a display according to the present invention includes: a transistor substrate 10; a color filter substrate 20 disposed on the transistor substrate 10; a liquid crystal cell 40 disposed between the transistor substrate 10 and the color filter substrate 20, the liquid crystal cell 40 including a plurality of protrusion structures 30 dividing the liquid crystal cell 40 into a first liquid crystal region 40a and a second liquid crystal region 40b, wherein the first liquid crystal region 40a corresponds to a blue pixel B, the second liquid crystal region 40b corresponds to a red pixel R and/or a green pixel G, and the first liquid crystal region 40a and the second liquid crystal region 40b respectively include a first liquid crystal a and a second liquid crystal a, and wherein a product of an average refractive index and a thickness of the first liquid crystal a is different from that of the second liquid crystal b.

In an embodiment of the invention, a pitch of the first liquid crystal region 40a and the second liquid crystal region 40b is maintained to be 2 to 7 times a distance of the first liquid crystal region 40a and the second liquid crystal region 40b, wherein the first liquid crystal region 40a corresponds to the blue pixel; and the second liquid crystal region 40b corresponds to the red pixel and a green pixel.

In an embodiment of the invention, pitches of the first and second liquid crystals are both 2 to 7 times the cell gap.

Accordingly, the present invention provides a novel display which increases the transmittance of the display device by increasing the average refractive index (Δn) of the liquid crystal. Further, a chiral agent is introduced into the liquid crystal in the blue region, thereby increasing the average refractive index (Δn), preventing a reversal from occurring while maintaining a brightness of the blue light, thereby solving the problem of yellowing or greening of the color point, thereby realizing a high-visibility large-angle display. Meanwhile, a plurality of protruding structures are formed inside a liquid crystal cell to seal the liquid crystal, restricting the flow of the liquid crystal, such that the display can also be used as a flexible display device.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:

1. A display, comprising:
   a transistor substrate;
   a color filter substrate disposed on the transistor substrate;
   a liquid crystal cell disposed between the transistor substrate and the color filter substrate, the liquid crystal cell comprising a plurality of protrusion structures dividing the liquid crystal cell into a first liquid crystal region and a second liquid crystal region, wherein
   the first liquid crystal region corresponds to a blue pixel, the second liquid crystal region corresponds to a red pixel or a green pixel, and the first liquid crystal region and the second liquid crystal region respectively comprise a first liquid crystal and a second liquid crystal, wherein only the first liquid crystal in the first liquid crystal region corresponding to the blue pixel is mixed with a chiral agent; and wherein
   a product of an average refractive index and a thickness of the first liquid crystal ranges from 350 nm to 450 nm, and a product of an average refractive index and a thickness of the second liquid crystal ranges from 290 nm to 380 nm.

2. The display according to claim 1, wherein the protrusion structures comprise at least one of: at least one black matrix, at least one photosensitive spacer, and a color filter layer disposed under the color filter substrate.

3. A display, comprising:
   a transistor substrate;
   a color filter substrate disposed on the transistor substrate;
   a liquid crystal cell disposed between the transistor substrate and the color filter substrate, the liquid crystal cell comprising a plurality of protrusion structures dividing the liquid crystal cell into a first liquid crystal region and a second liquid crystal region, wherein
   the first liquid crystal region corresponds to a blue pixel, the second liquid crystal region corresponds to a red pixel or a green pixel, and the first liquid crystal region and the second liquid crystal region respectively comprise a first liquid crystal and a second liquid crystal, wherein only the first liquid crystal in the first liquid crystal region corresponding to the blue pixel is mixed with a chiral agent; and wherein
   a product of an average refractive index and a thickness of the first liquid crystal is different from that of the second liquid crystal.

4. The display according to claim 3, wherein the protrusion structures comprise at least one of: at least one black matrix, at least one photosensitive spacer, and a color filter layer disposed under the color filter substrate.

5. The display according to claim 3, wherein the product of the average refractive index and the thickness of the first liquid crystal ranges from 350 nm to 450 nm.

6. The display according to claim 3, wherein the product of the average refractive index and the thickness of the second liquid crystal ranges from 290 nm to 380 nm.

7. A method of manufacturing a display, comprising:
   S10, providing a transistor substrate;
   S20, providing a color filter substrate;
   S30, forming a plurality of protrusion structures on the transistor substrate or the color filter substrate to define a first liquid crystal region and a second liquid crystal region, wherein the first liquid crystal region corresponds to a blue pixel, and the second liquid crystal region corresponds to a red pixel or a green pixel;

S40, injecting a first liquid crystal and a second liquid crystal respectively into the first liquid crystal region and the second liquid crystal region, and wherein a product of an average refractive index and a thickness of the first liquid crystal is different from that of the second liquid crystal, wherein only the first liquid crystal in the first liquid crystal region corresponding to the blue pixel is mixed with a chiral agent; and S50: assembling the transistor substrate and the color filter substrate to define a liquid crystal cell between the transistor substrate and the color filter substrate to obtain the display.

8. The method of manufacturing the display according to claim 7, wherein the protrusion structures comprise at least one of: at least one black matrix, at least one photosensitive spacer, and a color filter layer disposed on the color filter substrate.

9. The method of manufacturing the display according to claim 7, wherein the product of the average refractive index and the thickness of the first liquid crystal ranges from 350 nm to 450 nm.

10. The method of manufacturing the display according to claim 7, wherein the product of the average refractive index and the thickness of the second liquid crystal ranges from 290 nm to 380 nm.

* * * * *